3,812,059
PERFUME COMPOSITIONS CONTAINING 6-PROPYL-3-CYCLOHEXENE CARBALDEHYDES
David de Rijke, Naarden, and Harmannus Boelens, Huizen, Netherlands, assignors to Naarden International N.V.
No Drawing. Filed Apr. 27, 1972, Ser. No. 248,127
Claims priority, application Netherlands, Apr. 27, 1971, 7105711
Int. Cl. A61k 7/00; C11b 9/00
U.S. Cl. 252—522        8 Claims

ABSTRACT OF THE DISCLOSURE

Perfume compositions containing substituted 6-propyl-3-cyclohexene carbaldehydes which are prepared by reacting 2-hexene-1-al with pentadienes or hexadienes by means of a Diels-Alder-reaction.

---

The invention relates to a process for the preparation of perfume compositions and perfumed products which contain as an odor imparting material an unsaturated alicyclic aldehyde together with other components usually employed for this purpose. More particularly the invention relates to perfume compositions containing 6-propyl-3-cyclohexene carbaldehydes of the formula

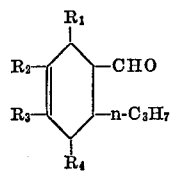

in which $R_1$, $R_2$, $R_3$ and $R_4$ represent a methyl group or an H-atom or in which $R_1$ together with $R_4$ form a methylene group and in which at least two of the four symbols $R_1$, $R_2$, $R_3$ and $R_4$ represent an H-atom. These compounds have not been described in the literature hitherto.

In the literature some methyl substituted 3-cyclohexene carbaldehydes have been mentioned as perfume material. Thus according to Arctander (Perfume and Flavor Chemicals, Montclair, 1969, monograph 996 and 761): 3,6-dimethyl-3-cyclohexene carbaldehyde of the formula

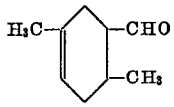

3,5,6-trimethyl-3-cyclohexene carbaldehyde of the formula

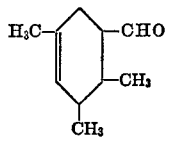

and 2,4,6-trimethyl-3-cyclohexene carbaldehyde of the formula

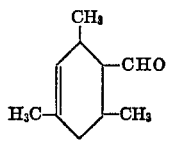

have green odors with an earthlike undertone, owing to which they are very suitable for a.o. galbanum compositions.

British Patent Specification 1,055,149 describes acetals of trialkyl substituted cyclic aldehydes of the formula

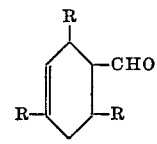

wherein R is an alkyl radical having 1 to 4 carbon atoms. These acetals have a strong fresh floral odor. However, nothing is said about the odor of the corresponding aldehydes with the exception of the odor of 3,5,6-trimethyl-3-cyclohexene carbaldehyde which is described as green.

Dutch Pat. 110,190 mentions the preparation of an odorant material by Diels-Alder-reaction of myrcenol with a dienophilic substance such as acrolein. The hydroxyaldehydes obtained, e.g., 4-(4-methyl-4-hydroxypentyl)-3-cyclohexene carbaldehyde of the formula

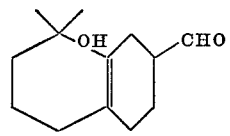

have a floral odor.

It has now been found that certain novel methyl substituted or 2,5-methylene substituted, 6-n-propyl-3-cyclohexene carbaldehydes are valuable perfumes, having spicy herbal odors, owing to which they can very well be used in modern perfume compositions. Thus, 2,4-dimethyl-6-n-propyl-3-cyclohexene carbaldehyde, a compound of the formula

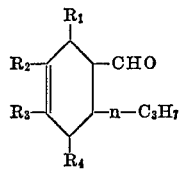

wherein $R_1=R_3=CH_3$ and $R_2=R_4=H$ has an intensively herbal rosy odor with a pepper touch, strongly reminiscent of geranium and wet rose leaves. The compound 4-methyl-6-n-propyl-3-cyclohexene carbaldehyde, wherein $R_3=CH_3$ and $R_1=R_2=R_4=H$ is strong spicy with a tone of celery whereas 2,5-methylene-6-n-propyl-3-cyclohexene carbaldehyde wherein $R_2=R_3=H$ and $R_1$ and $R_4$ together form —$CH_2$— has a herbal odor connected with rosemary, aspic and sweet flag.

The present compounds may, a.o., be prepared by a Diels-Alder-reaction of 2-hexene-1-al with suitable pentadienes and hexadienes such as cyclopentadiene, isoprene, 1,3-pentadiene or 2-methyl-1,3-pentadiene. The compounds may be obtained in the form of a mixture. Thus the production of 3,5-dimethyl-6-n-propyl-cyclohexene carbaldehyde of the formula

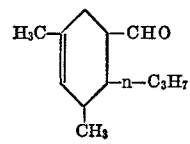

may be expected together with the 2,4-dimethyl compound of the formula

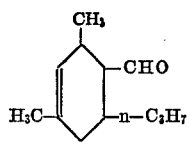

The production of the 4-methyl compound of the formula

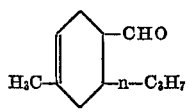

and the 3-methyl compound of the formula

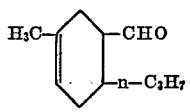

may be expected together. Also the production of the 2-methyl compound of the formula

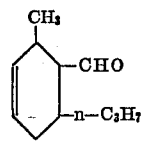

may be expected together with the 5-methyl compound of the formula

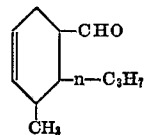

The following examples are illustrative of this invention.

EXAMPLE I

Preparation of 2,4-dimethyl-6-n-propyl-cyclohexene carbaldehyde

Into a 1 liter reaction flask, equipped with a stirrer, reflux condenser, dropping funnel, gas inlet tube and thermometer, 90 g. of 2-methyl-1,3-pentadiene and 1 g. zinc chloride are placed. Under stirring and the introduction of nitrogen the contents of the flask are brought to a reflux temperature of 75° C. Thereafter 95 g. of 2-hexene-1-al are added dropwise in a period of up to 1 hour under conditions of boil. The temperature of the contents of the flask rises to 120° C. After stirring for another half hour the reaction mixture is cooled to 20° C., after which 75 g. of toluene are added. The toluene solution is washed in a separating funnel with a 5 percent sodium bicarbonate solution until weakly basic to litmus and thereafter with water until neutral. After drying, evaporation and fractionation 66 g. of 2,4-dimethyl-6-n-propyl-cyclohexene carbaldehyde is obtained with a boiling point of 85° C. at 4 mm. Hg, $n_D^{20}$ 1.4740. Most probably the compound obtained is a mixture of the 2,4- and the 3,5-di-methyl compound.

If 1,3-pentadiene is reacted with hexene-1-al a mixture of 2-methyl and 5-methyl-6-n-propyl-3-cyclohexene carbaldehyde is formed having a boiling point of 102–104° C. at 11 mm., $n_D^{20}$ 1.4721.

EXAMPLE II

Preparation of 2,5-methylene-6-n-propyl-3-cyclohexene-carbaldehyde

The preparation of 2,5-methylene-6-n-propyl-3-cyclohexene-carbaldehyde can be carried out without catalyst in the reaction mixture. It is not necessary to use cyclopentadiene monomer because the dimer, dicyclopentadiene, is transferred into the monomer under the reaction conditions. The preparation proceeds as follows:

Into a 250 ml. distillation flask, equipped with a reflux condenser dropping funnel, nitrogen inlet and thermometer is introduced 98 g. of 2-hexene-1-al and 80 g. dicyclopentadiene. The contents of the flask are heated to the boil under a nitrogen atmosphere and refluxed for 8 hours. The temperature of the reaction mixture rises from 145 to 168° C. Thereafter the contents of the flask are cooled down to 50° C. and fractionated under decreased pressure in a 40 cm. Vigreux column. There are obtained 99 g. of 2,5 - methylene-6-n-propyl-3-cyclohexene carbaldehyde with a boiling point of 103° C. at 3 mm. Hg, $n_D^{20}$ 1.4808.

EXAMPLE III

Perfume composition of the "Fougere" type

| | Parts by weight |
|---|---|
| Cinnamic alcohol | 50 |
| Muskus ambrett | 40 |
| Vanillin | 5 |
| | — |
| | 95 |
| | — |
| Coumarin | 80 |
| Oakmoss resinoid | 10 |
| Linalool | 125 |
| Linalyl acetate | 150 |
| Benzyl acetate | 50 |
| Phenylethanol | 70 |
| Oil of bergamot | 100 |
| Oil of lavender 45/47 | 150 |
| Geranium oil (Bourbon) | 50 |
| Sandlewood oil E.I. | 50 |
| Eugenol | 5 |
| Isoeugenol | 15 |
| Amyl salicylate | 20 |
| Benzyl salicylate | 20 |
| 2,5-methylene-6-n-propyl - 3 - cyclohexenecarbaldehyde | 10 |
| | 1000 |

EXAMPLE IV

Perfume composition of the "Rose" type

| | Parts by weight |
|---|---|
| Phenylethyl phenyl acetate | 20 |
| Phenylethyl salicylate | 40 |
| Geraniol | 150 |
| Phenylethanol | 240 |
| Citronellol | 150 |
| Sandlewood oil E.I. | 20 |
| | 620 |
| | — |
| Nonane diacetate-1,3 | 75 |
| Geranyl acetate | 50 |
| Geranyl phenylacetate | 20 |
| Citronellyl formiate | 20 |
| Phenylethyl acetate | 25 |
| Phenylethyl propionate | 60 |
| Phenylacetaldehyde 50% in diethylphthalate | 20 |
| Phenylacetaldehyde 1,3-butyleneglycol acetal | 20 |
| Eugenol | 10 |
| Methylisoeugenol | 20 |
| α-Hexylcinnamic aldehyde | 50 |
| 2,4-dimethyl - 6 - n-propyl - 3 - cyclohexene carbaldehyde | 10 |
| | 1000 |

EXAMPLE V

Perfume composition of the "Bouquet" type

| | Parts by weight |
|---|---|
| Muskus ambrette | 20 |
| Heliotropine | 40 |
| Benzyl acetate | 100 |
| 4-tert.butyl cyclohexyl acetate | 80 |
| α-Hexylcinnamic aldehyde | 130 |
| α-Amylcinnamic aldehyde | 40 |
| Linalyl acetate | 30 |
| Terpineol | 80 |
| Geranyl acetate | 80 |
| Linalool | 80 |
| α-Methyl jonone | 100 |
| | 680 |
| Methyl isoeugenol | 25 |
| Isoeugenol | 15 |
| Geraniol | 40 |
| Phenylethanol | 60 |
| Styrallyl acetate | 20 |
| Vetiveryl acetate | 50 |
| 10-undecene-1-al | 5 |
| 4-methyl-6-n-propyl-3-cyclohexenecarbaldehyde | 5 |
| | 1000 |

What is claimed is:

1. A perfume composition comprising effective amounts of an odor imparting material and at least one 6-propyl-3-cyclohexene carbaldehyde of the formula

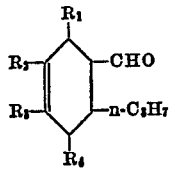

wherein $R_1$, $R_2$, $R_3$, and $R_4$ are radicals selected from the group consisting of $CH_3$—, H, and —$CH_2$— when bridging $R_1$ and $R_4$, and wherein at least two of $R_1$, $R_2$, $R_3$ and $R_4$ are H.

2. The composition of claim 1 wherein said carbaldehyde is present in an amount of from 0.1–5.0 percent by weight.

3. The composition of claim 1 wherein said carbaldehyde is present in an amount of from 0.1–2.0 percent by weight.

4. The composition of claim 1 wherein said 6-propyl-3-cyclohexene carbaldehyde is 2,4-dimethyl-6-n-propyl-3-cyclohexene carbaldehyde.

5. The composition of claim 1 wherein said 6-pyropyl-3-cyclohexene carbaldehyde is 3,5-dimethyl-6-n-propyl-3-cyclohexene carbaldehyde.

6. The composition of claim 1 wherein said 6-propyl-3-cyclohexene carbaldehyde is 2-methyl-6-n-propyl-3-cyclohexene carbaldehyde.

7. The composition of claim 1 wherein said 6-propyl-3-cyclohexene carbaldehyde is 5-methyl-6-n-propyl-3-cyclohexene carbaldehyde.

8. The composition of claim 1 wherein said 6-propyl-3-cyclohexene carbaldehyde is 2,5-methylene-6-n-propyl-3-cyclohexene carbaldehyde.

References Cited

Gattefosse, Formulary of Perfumes and Cosmetics (1959), pp. 127, 128 and 129.

SAM ROSEN, Primary Examiner

U.S. Cl. X.R.

260—598